(12) United States Patent
Barbe et al.

(10) Patent No.: US 7,380,400 B2
(45) Date of Patent: *Jun. 3, 2008

(54) SYSTEM AND METHOD FOR HIGH PRESSURE AND LOW PRESSURE EXHAUST GAS RECIRCULATION CONTROL AND ESTIMATION

(75) Inventors: David Barbe, Ann Arbor, MI (US); Michiel J. van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

This patent is subject to a terminal disclaimer.

(21) Appl. No.: 11/245,630

(22) Filed: Oct. 6, 2005

(65) Prior Publication Data

US 2007/0079614 A1 Apr. 12, 2007

(51) Int. Cl.
*F02M 25/07* (2006.01)
*F02B 33/44* (2006.01)
*F02B 47/08* (2006.01)

(52) U.S. Cl. .............. 60/605.2; 123/568.12; 123/568.2; 123/568.11

(58) Field of Classification Search ........ 60/605.2; 123/568.12, 568.2, 568.11; F02M 25/07
See application file for complete search history.

(56) References Cited

U.S. PATENT DOCUMENTS

| | | | |
|---|---|---|---|
| 5,010,314 A | 4/1991 | Estrov | |
| 6,178,749 B1 | 1/2001 | Kolmanovsky et al. | 60/605.2 |
| 6,732,723 B2 | 5/2004 | Van Nieuwstadt | 123/568.19 |
| 6,863,058 B2 | 3/2005 | Kurtz et al. | 123/672 |
| 6,973,786 B1 * | 12/2005 | Liu et al. | 60/605.2 |
| 6,988,365 B2 * | 1/2006 | Sasaki | 60/605.2 |
| 7,013,879 B2 * | 3/2006 | Brookshire et al. | 60/605.2 |
| 7,043,914 B2 * | 5/2006 | Ishikawa | 60/605.2 |
| 7,047,741 B2 * | 5/2006 | Gray, Jr. | 60/603 |
| 7,165,540 B2 * | 1/2007 | Brookshire et al. | 60/605.2 |
| 7,219,661 B2 * | 5/2007 | Aberle | 123/568.12 |
| 2004/0050375 A1 * | 3/2004 | Arnold | 60/605.2 |
| 2006/0137665 A1 * | 6/2006 | Khair et al. | 60/605.2 |
| 2006/0156723 A1 * | 7/2006 | Tonetti et al. | 60/605.2 |
| 2007/0023005 A1 * | 2/2007 | Chmela | 123/305 |
| 2007/0089400 A1 * | 4/2007 | Huang | 123/568.12 |
| 2007/0125081 A1 * | 6/2007 | Czarnowski et al. | 60/605.2 |
| 2007/0125349 A1 * | 6/2007 | Zanini-Fisher et al. | 123/679 |
| 2007/0144501 A1 * | 6/2007 | Joergl et al. | 123/568.12 |
| 2007/0246028 A1 * | 10/2007 | Fujita et al. | 60/605.2 |

FOREIGN PATENT DOCUMENTS

| | | | |
|---|---|---|---|
| JP | 2002021625 A | * | 1/2002 |
| JP | 2004150319 A | * | 5/2004 |
| JP | 2005076456 A | * | 3/2005 |
| JP | 2005127247 A | * | 5/2005 |
| JP | 2005240758 A | * | 9/2005 |
| JP | 2006336547 A | * | 12/2006 |

* cited by examiner

*Primary Examiner*—Thai-Ba Trieu
(74) *Attorney, Agent, or Firm*—Julia Voutyras; Alleman Hall McCoy Russell & Tuttle, LLP

(57) ABSTRACT

A system for a diesel engine having an intake manifold and an exhaust manifold is described. The system may include both a high pressure and low pressure exhaust gas recirculation system, as well as a turbocharger. Further, in one example, the system may include two mass airflow sensors appropriately placed to enable improved control of both the high and low pressure exhaust gas recirculation systems.

14 Claims, 3 Drawing Sheets

US 7,380,400 B2

SYSTEM AND METHOD FOR HIGH PRESSURE AND LOW PRESSURE EXHAUST GAS RECIRCULATION CONTROL AND ESTIMATION

BACKGROUND AND SUMMARY

Diesel engines may use re-ingesting burnt exhaust gases to increase fuel economy and reduce emissions. For example, an exhaust gas recirculation (EGR) system may be used to recirculate exhaust gases from the exhaust manifold to the intake manifold. Such operation can displace fresh air and lower oxygen concentration in the cylinder, as well as reduce formation of NOx during combustion.

In some engine configurations that have a turbocharger, both a low pressure and high pressure EGR system may be used. For example, a high pressure (HP) EGR loop from the exhaust manifold (upstream of the turbine of turbocharger) to the intake manifold (downstream of the compressor of the turbocharger), may be used. In addition, a low pressure (LP) loop from downstream of the turbine to upstream of the compressor may also be used. See, for example, U.S. Pat. No. 6,863,058.

The inventors herein have recognized a disadvantage with such an approach. Specifically, in some cases, the HP EGR rate may be estimated based on a mass airflow sensor located upstream of the HP EGR inlet in the intake manifold. However, when using both a HP and LP EGR loop, this reading is typically biased by EGR from the LP EGR system, if both EGR systems are active. As such, degraded estimation, and thus control, of the HP and LP EGR system can result.

Further, the inventors herein have also recognized that when using a dual EGR loop, the interaction between the two EGR flows may cause inadvertent conditions to exist, such as total EGR flow becoming too great or too small. For example, if insufficient pressure exists across the EGR loops, insufficient EGR may be obtained. Likewise, transient conditions may exist where total EGR becomes greater than that desired.

At least some of the above issues may be addressed by a system for a diesel engine having an intake manifold and an exhaust manifold, comprising of a turbocharger coupled between the intake and exhaust manifolds of the engine; a low pressure exhaust gas recirculation system with a first end coupled to the exhaust manifold downstream of the turbocharger and a second end coupled to the intake manifold upstream of the turbocharger, said low pressure exhaust gas recirculation having a first valve coupled thereto for regulating flow; a high pressure exhaust gas recirculation system with a first end coupled to the exhaust manifold upstream of the turbocharger and a second end coupled to the intake manifold downstream of the turbocharger said low pressure exhaust gas recirculation having a second valve coupled thereto for regulating flow; a first mass airflow sensor coupled in the engine intake manifold upstream of said second end of said low pressure exhaust gas recirculation system; and a second mass airflow sensor coupled in the engine intake manifold downstream of said second end of said low pressure exhaust gas recirculation system and upstream of said second end of said high pressure exhaust gas recirculation system.

In this way it is possible to provide a system that can accurately control both high and low pressure EGR flows, even when both systems are concurrently active. In one example, this is provided by the ability to estimate low pressure EGR flow independently of HP EGR flow via use of a sensor located in the intake system upstream of the low pressure EGR inlet, in addition to other information. In another example, two mass airflow sensors may be used to differentiate high and low pressure EGR flow. Still other examples are possible, as described below herein.

In another embodiment, at least some of the above issues may be addressed by a method for controlling a diesel engine having an intake manifold and an exhaust manifold, the engine further having a turbocharger coupled between the intake and exhaust manifolds of the engine, a low pressure exhaust gas recirculation system with a first end coupled to the exhaust manifold downstream of the turbocharger and a second end coupled to the intake manifold upstream of the turbocharger, said low pressure exhaust gas recirculation system having a first valve coupled thereto for regulating flow, a high pressure exhaust gas recirculation system with a first end coupled to the exhaust manifold upstream of the turbocharger and a second end coupled to the intake manifold downstream of the turbocharger said low pressure exhaust gas recirculation system having a second valve coupled thereto for regulating flow, a first throttle coupled in the intake manifold between said second end of said high pressure exhaust gas recirculation system and said second end of said low pressure exhaust gas recirculation system, and a second throttle coupled upstream of said second end of said low pressure exhaust gas recirculation system, the method comprising; adjusting said first valve and said first throttle to regulate flow in the high pressure system; and adjusting said second valve and said second throttle to regulate flow in the low pressure system.

In this way, it is possible to use coordinate control of two EGR flow valves and two throttles in the intake manifold to achieve improved overall operation. For example, sufficient EGR flow from respective high and low pressure systems may be achieved under varying operating conditions.

DETAILED DESCRIPTION

Figure 1:
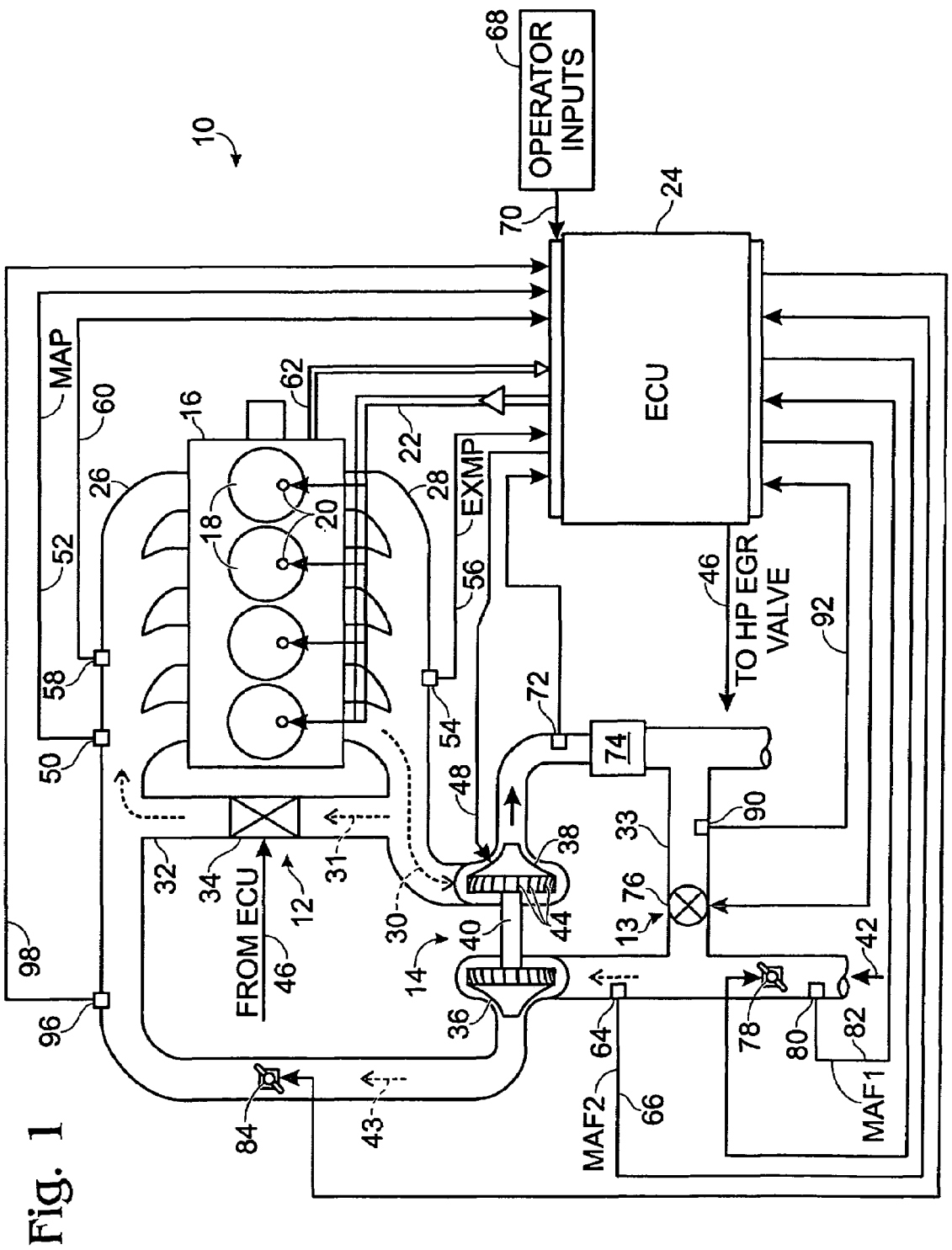
FIG. 1 is a schematic view of a compression ignition engine system having an EGR system and a VGT.

Turning first to FIG. 1, there is shown a simplified schematic diagram of a compression ignition engine system 10 equipped with a high pressure and low pressure exhaust gas recirculation (EGR) system (12 and 13, respectively) and a variable geometry turbocharger (VGT) 14. A representative engine block 16 is shown having four combustion chambers 18, although more or fewer cylinders may be used if desired. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system. The EGR system includes a high pressure (HP) EGR system 12, which comprises a conduit 32 connecting the exhaust manifold 28 to the intake manifold 26. This allows a portion of the exhaust gases to be circulated from the exhaust manifold 28 to the intake manifold 26 in the direction of arrow 31. A HP EGR valve 34 regulates the amount of exhaust gas recirculated from the exhaust manifold 28. The valve 34 may be a throttle plate, pintle-orifice, slide valve, or any other type of variable valve. Further, a low pressure (LP) EGR system 13 is shown, which includes a conduit 33 connecting gases from the output of the turbocharger turbine (discussed below) to the inlet of the turbocharger compressor. This allows a portion of the exhaust gases to be circulated from the exhaust to the intake upstream of the turbocharger system, and thus at lower pressures. A LP EGR valve 76, similar to valve 34, may be used to regulate the flow of LP EGR. Each of valves 34 and 76 may be controlled by ECU 24.

In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture by reducing excess oxygen.

Turbocharger 14 uses exhaust gas energy to increase the mass of the air charge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 includes a compressor 36 and a turbine 38 coupled by a common shaft 40. The exhaust gas 30 drives the turbine 38 which drives the compressor 36 which, in turn, compresses ambient air 42 (and LP EGR gas, if present) and directs it (arrow 43) into the intake manifold 26. The VGT 14 can be modified as a function of engine speed during engine operation by varying the turbine flow area and the angle at which the exhaust gas 30 is directed at the turbine blades. This is accomplished by changing the angle of the inlet guide vanes 44 on the turbine 38. The operating position for the engine guide vanes 44 is determined from the desired engine operating characteristics at various engine speeds and loads by ECU 24.

Between turbine 38 and the LP EGR system 13 may be an emission control system 74, which may include one or more emission control devices, such as a particulate filter, oxidation catalyst, selective catalytic reduction catalyst, NOx trap, or combinations thereof. Further additional devices may be included upstream of turbine 38 and/or downstream of system 74. In one embodiment, one or more pressure and/or temperature sensors may be coupled in system 74, and used to adjust engine operation.

As can be appreciated from FIG. 1, both EGR systems 12 and 13 and the VGT 14 regulate gas flow from the exhaust manifold 28. The effect of the EGR and VGT is, therefore, jointly dependent upon the conditions in the exhaust manifold 28. EGR flows and fresh air flows may also be regulated by adjusting either the high pressure EGR throttle 84 or the low pressure EGR throttle 78, which are both controlled by ECU 24.

All of the engine systems, including the EGR systems 12 and 13, VGT 14, throttle valves 78 and 84, and fuel injectors 20 are controlled by the ECU. For example, signal 46 from the ECU 24 regulates the HP EGR valve position, and signal 48 regulates the position of the VGT guide vanes 44.

In the ECU 24, the command signals 46, 48 to the EGR system 12 and VGT 14 actuators, as well as other command signals, are calculated from measured variables and engine operating parameters. Sensors and calibratable lookup tables provide the ECU 24 with engine operating information. For example, manifold absolute pressure (MAP) sensor 50 provides a signal 52 to the ECU 24 indicative of the pressure in the intake manifold 26 downstream of the HP EGR entrance, and pressure sensor 96 provides a signal 98 indicative of pressure upstream of the HP EGR entrance in the intake manifold. Likewise, exhaust manifold pressure (EXMP) sensor 54 provides an EXMP signal 56 to the ECU 24 indicative of the pressure in the exhaust manifold 28 upstream of the HP EGR exit. Further, an air charge temperature sensor 58 provides a signal 60 to the ECU 24 indicative of the temperature of the intake air charge 42. A first mass airflow (MAF1) sensor 80 and a second mass airflow (MAF2) sensor 64 also provide signals 82 and 66 respectively indicative of the respective airflows in the intake system to the ECU 24. While FIG. 1 shows sensor 80 in the intake manifold upstream of the LP EGR inlet and upstream of throttle 78, it may also be located downstream of the throttle, for example. Further, while FIG. 1 shows sensor 64 in the intake manifold downstream of the LP EGR inlet and upstream of the HP EGR inlet and upstream of turbocharger 14, sensor 64 may also be located downstream of turbocharger 14 and either upstream or downstream of throttle 84, while still upstream of the HP EGR inlet.

Sensors may also provide information as to valve position for feedback control, such as for any or each of valves 34, 84, 76, and 78. Also, exhaust pressure in the LP EGR system may be provided by pressure sensor 90 via signal 92. In addition, exhaust gas oxygen concentration, which can be indicative of air-fuel ratio, can be provided by oxygen sensor 72. Additional sensory inputs can also be received by the ECU along signal line 62 such as engine coolant temperature, engine speed, and throttle position. Additional operator inputs 68 are received along signal 70 such as acceleration pedal position. Based on the sensory inputs and engine mapping data stored in memory, the ECU controls the EGR systems, throttles, and VGT to regulate the intake airflow, recirculated exhaust gases, and/or the intake manifold pressure (MAP) and controls injectors 20 to regulate fuel delivery.

Under some conditions, in order to reach a desired total EGR flow rate in the intake manifold at certain speeds and loads, one or both of the LP and HP EGR systems may be used. In other words, only the HP EGR loop is used under some conditions, only the LP EGR loop is used under other conditions, and both loops are used under still other conditions. However, since EGR may take one or more paths under different conditions, it can be difficult to determine an amount and composition of, as well as control, a quantity of EGR flow in the intake manifold.

One example approach for estimation and control offers an improved solution for the control of low pressure EGR, and offers improved accuracy in transients and improved robustness in the face of noise factors. This example utilizes a set of sensors that can provide an indication of both the LP and HP EGR mass flow. In this way, the flows may be independently identified and thus accurately controlled. In one embodiment, a mass airflow sensor located upstream of the LP EGR inlet, along with additional flow and/or pressure sensors, may be used to advantage in providing accurate estimation and control of low pressure and high pressure EGR flow.

Figure 2:
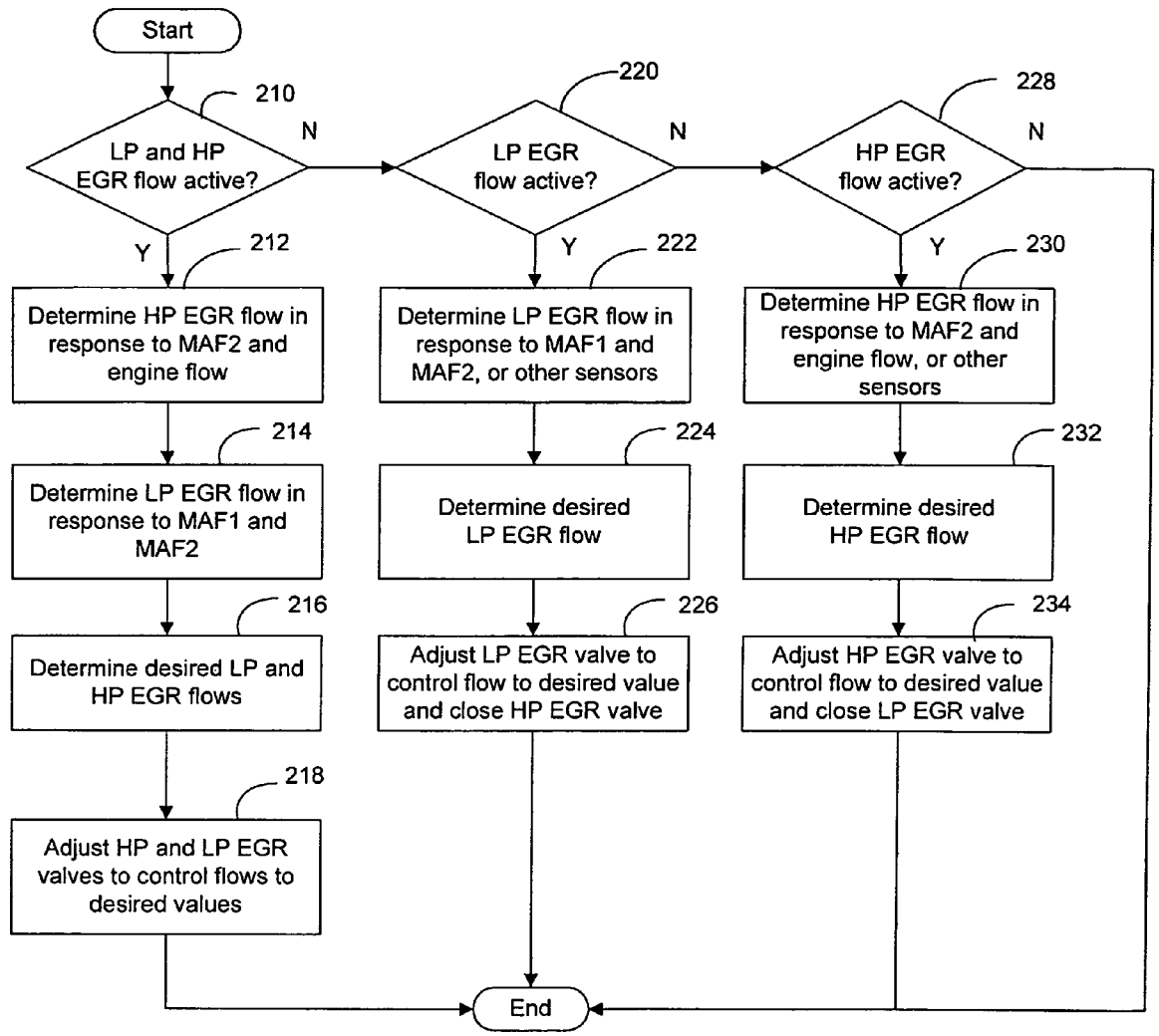
FIGS. 2-3 are high level flowcharts of example operation.

Referring now to FIG. 2, a routine is described for controlling LP and HP EGR valves. In this example, the routine first determines in 210 whether both high and low pressure EGR systems are active. If so, the routine continues to 212 to determine the high pressure EGR flow. This flow can be estimated by determining the amount of flow entering a defined volume, such as the intake manifold from the entrance of the LP EGR system to the engine, the amount of flow exiting the volume, and any flow compressibility in the volume. In one example, the flow exiting is the flow entering the engine (W_eng), which can be calculated from volumetric efficiency (stored in the ECU as a function of speed and other engine operating parameters) and the manifold pressure (MAP) from sensor 50. The flow entering can be determined from sensor 64 (MAF2), if such a sensor is provided. In an alternative embodiment, the flow entering can be estimated from the pressure drop across throttle 84 using an orifice flow equation.

Thus, in one approach, the following equations may be used to determine the HP EGR flow (W_egr_hp):

$$W\_egr\_hp = d(m\_int)/dt + W\_eng - MAF2$$

where MAF2 is the flow measured by the MAF sensor downstream of the LP EGR intake, W_eng is the engine flow, calculated from volumetric efficiency and m_int is the estimated mass of gases in the intake manifold based on the ideal gas law.

Next, in 214, the routine determines the LP EGR flow present which can be determined based on the total flow upstream of the HP EGR inlet (e.g., MAF2) minus the flow entering the intake (e.g., 42 measured by MAF1). Alternatively, flow entering the intake may be estimated based on the pressure values upstream and downstream of throttle 78 using an orifice equation, if desired.

Next, in 216, the routine determines the desired LP and HP EGR flows based on operating conditions, such as speed and load. Then, in 218, the routine adjusts the LP and HP EGR valves (34, 90) based on comparing the desired flows to the estimated or measured values. In one example, a feedback controller, such as a proportional or proportional-integral (PI) controller may be used, where the valve commands are determined as:

$$Cmd\_egr\_lp = PI(W\_EGR\_lp - W\_EGR\_lp\_des(N, trq))$$

$$Cmd\_egr\_hp = PI(W\_EGR\_hp - W\_EGR\_hp\_des(N, trq))$$

where Cmd_egr_lp/hp are the adjustments, or commanded duty cycle or positions to the EGR valves, and $W\_EGR\_{lp/hp}\_des$ are the desired low pressure and high pressure EGR flows, which may be a function of speed (N), torque (trq), load or other engine operating conditions.

If the answer to 212 is no, the routine continues to 220 to determine whether the LP EGR system is active. If so, the routine continues to 222 to determine the amount of LP EGR flow, such as using the calculation described above in 214. Then, the routine continues to 216 to determine a desired LP EGR flow, and then adjust the LP EGR valve in 218 based on the desired and estimated values, which may be done using a PI controller as described above.

If the answer to 220 is no, the routine continues to 228 to determine whether the HP EGR system is active. If so, the routine continues to 230 to determine the amount of HP EGR flow, such as using the calculation described above in 212. Then, the routine continues to 232 to determine a desired HP EGR flow, and then adjust the HP EGR valve in 234 based on the desired and estimated values, which may be done using a PI controller as described above.

If the answer to 228 is no, the routine closes both LP and HP EGR valves, and moves the throttles to a desired value based on operating conditions.

In this way, it is possible to provide independent and accurate control of the EGR systems by providing an accurate estimate and/or measurement of the LP and HP EGR flows. Specifically, in an embodiment using a mass airflow sensor upstream of the LP EGR inlet (and optionally using a second mass airflow sensor downstream of the LP EGR inlet), accurate determination of the LP EGR flow and thus accurate control of EGR may be achieved.

Figure 3:
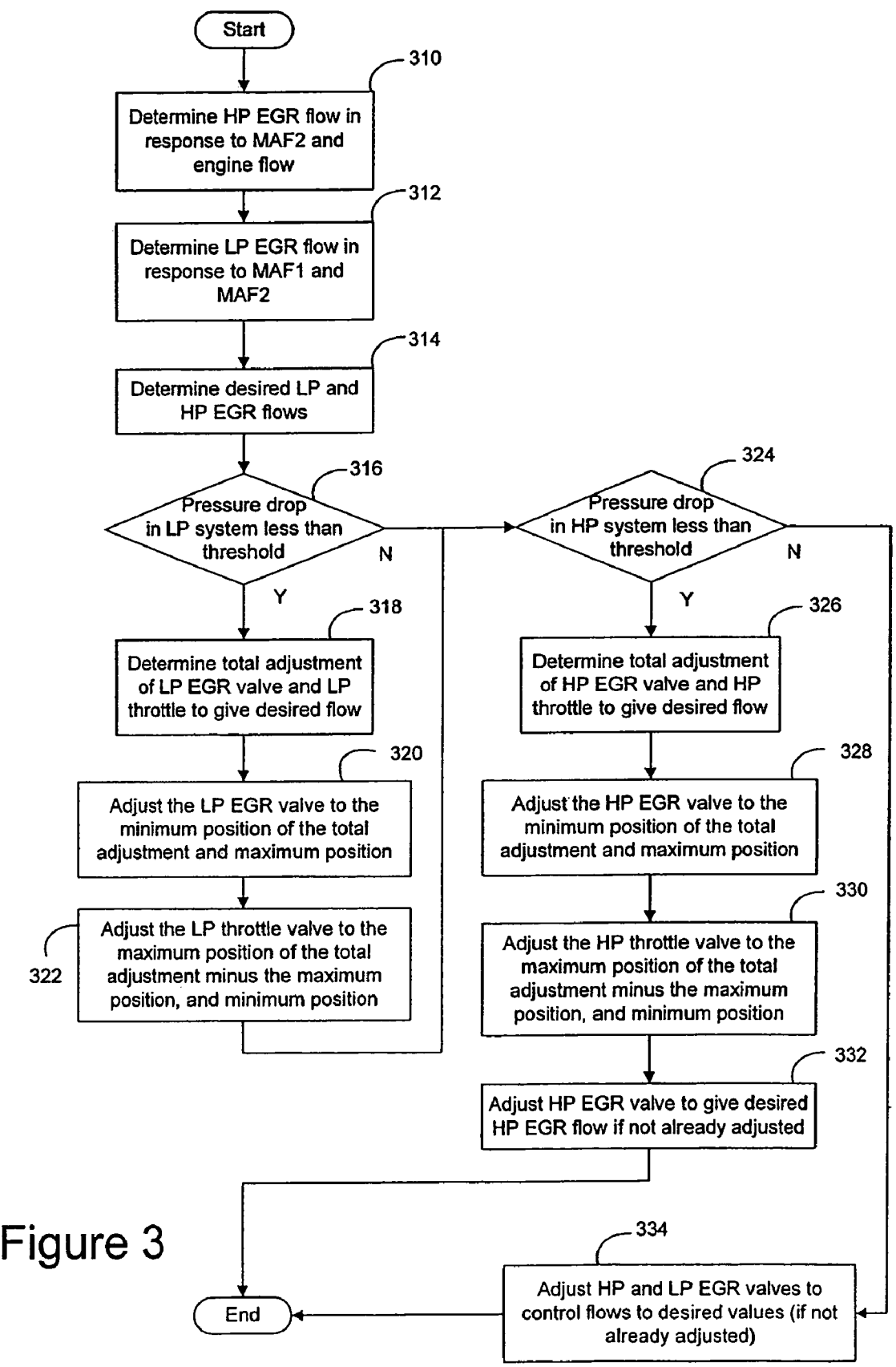

While FIG. 2 shows one example embodiment for controlling and estimating EGR flows, an alternative embodiment is described in FIG. 3. In the example of FIG. 3, coordinated control of multiple EGR valves and throttle valves is provided to provide accurate control even under varying or transient operating conditions.

Specifically, FIG. 3 shows an alternative embodiment that may be used when both LP and HP EGR flow is active. In 310-312, the routine determines values of the HP and LP EGR flows, and then determines desired HP and LP EGR flows in 314, similar to that shown with regard to 212-216 discussed above. Then, in 316, the routine determines whether the pressure differential across the LP EGR system is greater than a threshold minimum value. The threshold value may be variable, for example, it may be an amount to give a desired flow at maximum LP EGR valve position, which can be a function of operating conditions, temperature, etc. Alternatively, a fixed threshold may be used, or the routine can determine whether the LP EGR valve is open greater than a threshold amount slightly less than maximum position.

If the answer to 316 is yes, the routine continues to 318 to adjust operation of (e.g., close) the LP throttle 78 to increase a vacuum in the air pipe upstream of the compressor side of the turbocharger 14. In one example, if the pressure drop across the LP EGR valve is not sufficient, a larger pressure drop can be generated by throttling the gas upstream of the low pressure intake. In one embodiment, a single control command may be used to achieve a larger range of LP EGR flow by using the following control structure carried out in 320 and 322:

$$Cmd\_egr\_lp = PI(W\_EGR\_lp - W\_EGR\_lp\_des(N, trq))$$

$$Cmd\_egrvv\_lp = \min(1, cmd\_egr\_lp)$$

$$Cmd\_egrthr\_lp = \max(0, cmd\_egr\_lp - 1)$$

where N is engine speed, trq is desired torque, min(1,cmd egr lp) is a minimum function, 1 is a unitless representation of maximum valve position, and max(0,cmd egr lp-1) is a maximum function.

A similar approach can then be taken for the HP EGR system if insufficient flow is obtained as determined at 324. For example, in 326-330, the following structure may be used:

$$Cmd\_egr\_hp = PI(W\_EGR\_hp - W\_EGR\_hp\_des(N, trq))$$

$$Cmd\_egrvv\_hp = \min(1, cmd\_egr\_hp)$$

$$Cmd\_egrthr\_hp = \max(0, cmd\_egr\_{hp} - 1)$$

Continuing with FIG. 3, if the answer to 324 is no, the routine continues to 334 to adjust the LP and HP EGR valve positions to achieve the desired flow as noted above with regard to 218.

While the above example adjusts EGR and/or throttle valve positions to obtain desired HP and LP EGR flows that are a function of conditions such as speed and load, other control objectives may be used. For example, the routine can adjust set points, or desired values, of HP and LP EGR flows to achieve a desired intake manifold temperature, T_int_des (N,trq), which is itself a function of engine operating conditions. For example:

$$W\_EGR\_hp\_des = W\_EGR\_hp\_des\_ff + PI(T\_int - T\_int\_des(N.trq))$$

$$W\_EGR\_lp\_des = W\_EGR\_lp\_des\_ff - PI(T\_int - T\_int\_des(N.trq))$$

where W_EGR_hp/lp_des_ff is the initial desired hp/lp EGR flow, which may be based on speed and load, for example.

In this way, it is possible to adjust HP and LP EGR flows, while also controlling intake manifold temperature, for example. Such operation may be used to advantage in achieving a desired cylinder charge temperature for low temperature homogenous charge compression ignition combustion, where the temperature rise of compression causes ignition rather than the injection timing of diesel fuel. Still other advantages may be achieved in that by controlling intake manifold temperature, exhaust temperature may be affected.

In still another alternative embodiment, the routine can control a LP/HP EGR fraction. In other words, the ratio of the EGR flows may be adjusted to vary during operating conditions, and be controlled via coordinated adjustment of the EGR and/or throttle valves as:

$$X\_egr\_lp = W\_egr\_lp / W\_eng$$

$$X\_egr\_hp = W\_egr\_hp / W\_eng$$

where X_egr_lp is the fraction of LP EGR flow, and X_egr_hp is the fraction of HP EGR flow. These values can then be controlled via the PI controller discussed above with regard to FIGS. 2 and/or 3. Further, intake manifold temperature control may also be included, if desired.

In yet another alternative embodiment, the routine can further include control of a burnt gas fraction. For example, using an exhaust lambda sensor (e.g., 72) the routine can estimate the burnt gas fraction in the LP and HP EGR flows and control the LP/HP burnt gas fractions in the intake manifold. In this example, additional sensor information may be used, such as the temperature in the intake manifold (58).

Specifically, the fraction of inert gas in the intake manifold (f_man) is discriminated into the fraction coming from the low pressure loop (f_man_lp) and the fraction of inert gas coming from the high pressure loop (f_man_hp). Each of these fractions is observed based on the previously described sensors and the specific space velocity of each EGR loop. These observers, which may be responsive to the lambda sensor and temperature sensor, allow an accurate estimation of the re circulated gas composition.

In one approach, the following differential equations may be used to model variations of the fraction in the intake manifold of inert gas coming from low pressure EGR loop and high pressure EGR loop, respectively:

$$d(f\_man\_lp)/dt = [(Fegrl*(MAF2-MAF1) - f\_man\_ip*(MAF2 + W\_egr\_hp))]/Mman$$

$$d(f\_man\_hp)/dt = [(Fegrhp \cdot f\_man\_hp)*W\_egr\_hp - f\_man\_hp * MAF2]/Mman$$

where Fman is the fraction of EGR gas in the manifold, f_man_lp is the fraction of EGR gas in the intake manifold coming from the low pressure EGR loop; f man-hp is the fraction of egr gas in the intake manifold coming from the high pressure EGR loop; Mman is the mass of gas in the manifold volume, f_egr_lp is the fraction of EGR gas at the outlet of the EGR low pressure manifold (which may be approximated by inversion the measured lambda value in the exhaust pipe with an additional transport delay which is specific to the LP EGR loop), f_egr_hp is the fraction of EGR gas at the outlet of the EGR high pressure manifold (which can be approximated by the inversion of the measured lambda value in the exhaust pipe with an additional transport delay which is specific to the HP EGR loop), and noting that Fman equals the combination of f_man_hp and f_man_lp, W_egr_lp equals the difference between MAF2 and MAF1, and W_egr_hp equals the difference between W_eng and MAF2.

A double control of the f_man_lp and f_man_hp may be so performed, using their respective valves, in a de-correlated way to achieve the desired fraction of inert gas in the intake manifold, in respecting the specific dynamic of both loops, the engine's dynamic requirements and in improving the robustness of the control with the use of the lambda sensor to know with accuracy the composition of the re-circulated gases.

More precisely desired values for the fraction of high and low pressure EGR (f_man_lp_des and f_man_hp_des) can be determined from a single desired fraction as:

$$f\_man\_lp\_des = k*f\_man\_des$$

$$f\_man\_hp\_des = (1-k)*f\_man\_des$$

So that f_man_des = f_man_hp_des + f_man_lp_des where f_man_des is the desired total fraction of burnt gas in the intake manifold, f_man_lp_des is the desired fraction of burnt gases in the intake manifold coming from the low pressure loop, f_man_hp_des is the desired fraction of burnt gases in the intake manifold coming from the high pressure loop, and k is an element of [0;1] and is the weight which determines the transfer of effort from one EGR loop to the other.

In other words, as k increases, f_man_ip_des increases, fman_hp_des decreases, and thus a higher fraction of burnt gases in the intake manifold is requested to come from the low pressure EGR loop and vice versa. The determination of k at the engine conditions allows a better adaptation of the use of each EGR loop based on their specific dynamics and/or limitations. The parameter k may be varied with numerous operating conditions, such as, for example, engine temperature, speed, load, or others.

Control of inert gas fractions can also be combined with the coordinated control of the EGR valves and throttle valves, and temperature control, if desired. Further, as noted below herein, compensation for transport delays may also be included.

As noted above herein, various measurement locations for flows may be used. In one example, since the EGR and/or mass flows are measured upstream of the intake manifold, it may be possible to compensate for flow delays in the low pressure EGR flow by estimating the transport delay between the LP EGR inlet and intake manifold and the high pressure EGR by estimating transport delay between HP EGR inlet and intake manifold. The transport delays may be estimated by dividing the pipe volume by a volumetric flow speed based on a representative density. Then, the routine can compensate for the flow delays by adjusting the desired flow amounts.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 24.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a diesel engine having an intake manifold and an exhaust manifold, the engine further having a turbocharger coupled between the intake and exhaust manifolds of the engine, a low pressure exhaust gas recirculation system with a first end coupled to the exhaust manifold downstream of the turbocharger and a second end coupled to the intake manifold upstream of the turbocharger, said low pressure exhaust gas recirculation system having a first valve coupled thereto for regulating flow, a high pressure exhaust gas recirculation system with a first end coupled to the exhaust manifold upstream of the turbocharger and a second end coupled to the intake manifold downstream of the turbocharger said high pressure exhaust gas recirculation system having a second valve coupled thereto for regulating flow, a first throttle coupled in the intake manifold between said second end of said high pressure exhaust gas recirculation system and said second end of said low pressure exhaust gas recirculation system, and a second throttle coupled upstream of said second end of said low pressure exhaust gas recirculation system, the method comprising:
adjusting said first valve and said first throttle to regulate flow in the high pressure system;
adjusting said second valve and said second throttle to regulate flow in the low pressure system;
decreasing opening of the first throttle while increasing opening of the first valve when pressure across the high pressure exhaust gas recirculation system is less than a first threshold; and
decreasing opening of the second throttle while increasing opening of the second valve when pressure across the low pressure exhaust gas recirculation system is less than a second threshold.

2. The method of claim 1 further comprising adjusting said turbocharger in response to variations in operating conditions, where said turbocharger is a variable geometry turbocharger.

3. The method of claim 2 further comprising adjusting one of said throttle valves and recirculation valves in response to a mass airflow sensor coupled in the intake manifold upstream of said second end of said low pressure system.

4. The method of claim 3 further comprising treating exhaust gas in an emission control device coupled downstream of the turbine.

5. A method for controlling flows in a first and second exhaust gas recirculation system of an engine, the engine having a turbocharger, the first exhaust gas recirculation system coupled between the engine intake and exhaust on a high pressure side of the turbocharger, the second exhaust gas recirculation system coupled between the engine intake and exhaust on a low pressure side of the turbocharger, the system further having a manifold pressure sensor coupled in said intake manifold downstream of said high pressure exhaust gas recirculation, a first mass airflow sensor coupled in the intake manifold upstream of the low pressure system, and a second mass airflow sensor coupled in the intake manifold between the low pressure exhaust gas recirculation system and the high pressure exhaust gas recirculation system the method comprising:
adjusting a first control valve in the engine to vary a flow in said high pressure exhaust gas recirculation system, said adjusting in response to the manifold absolute pressure sensor and the second mass airflow sensor, and adjusting a second control valve in the engine to vary the flow in said low pressure exhaust gas recirculation system in response to the first and second mass airflow sensors to provide both high and low pressure exhaust gas recirculation flows;
closing the second control valve and adjusting the first control valve in the engine to vary the flow in said high pressure exhaust gas recirculation system, said adjusting in response to the manifold pressure sensor and the second mass airflow sensor to provide only high pressure exhaust gas recirculation flow; and
closing the first control valve and adjusting the second control valve in the engine to vary the flow in said low pressure exhaust gas recirculation system, said adjusting in response to the first and second mass airflow sensors to provide only low pressure exhaust gas recirculation flow.

6. The method of claim 5 where adjusting the first control valve includes adjusting a first EGR valve in the high pressure exhaust gas recirculation system and a first throttle in the intake downstream of the high pressure exhaust gas recirculation system; and where adjusting the second control valve includes adjusting a second EGR valve in the low pressure exhaust gas recirculation system and a second throttle in the intake upstream of the high pressure exhaust gas recirculation system.

7. A system for a diesel engine having an intake manifold and an exhaust manifold, comprising:
a turbocharger coupled between the intake and exhaust manifolds of the engine;
a low pressure exhaust gas recirculation system with a first end coupled to the exhaust manifold downstream of the turbocharger and a second end coupled to the intake manifold upstream of the turbocharger, said low pressure exhaust gas recirculation having a first valve coupled thereto for regulating flow;

a first throttle valve coupled in the intake manifold upstream of the second end of the low pressure exhaust gas recirculation system;

a high pressure exhaust gas recirculation system with a first end coupled to the exhaust manifold upstream of the turbocharger and a second end coupled to the intake manifold downstream of the turbocharger, said high pressure exhaust gas recirculation having a second valve coupled thereto for regulating flow;

a second throttle valve coupled in the intake manifold downstream of the second end of the high pressure exhaust gas recirculation system;

a first mass airflow sensor coupled in the engine intake manifold upstream of said second end of said low pressure exhaust gas recirculation system;

a second mass airflow sensor copied in the engine intake manifold upstream of said second end of said high pressure exhaust gas recirculation system and downstream of said second end of said low pressure exhaust gas recirculation system; and a controller configured to,
when pressure across the low pressure exhaust gas recirculation system is less than a first threshold, decreasing opening of the first throttle valve while increasing opening of the first valve; and
when pressure across the high pressure exhaust gas recirculation system is less than a second threshold, decreasing opening of the second throttle valve while increasing opening of the second valve.

8. The system of claim 7 where the controller is further configured to estimate and control flows in said low pressure exhaust gas recirculation system and said high pressure exhaust gas recirculation system in response to at least said first and second mass airflow sensors.

9. The system of claim 8 wherein said controller is further configured to estimate and control flows in said low pressure exhaust gas recirculation system and said high pressure exhaust gas recirculation system in response to at least one of a manifold pressure, engine speed, and air charge temperature.

10. The system of claim 8 wherein said controller is further configured to adjust said first and second exhaust gas recirculation valves to adjust temperature in the intake manifold.

11. The system of claim 8 wherein said controller is further configured to maintain a desired ratio of exhaust gas recirculation flows in said low and high pressure exhaust gas recirculation systems.

12. The system of claim 8 wherein said controller is further configured to estimate a burnt gas fraction in said exhaust gas recirculation systems in response to an oxygen sensor in the exhaust manifold.

13. The system of claim 8 wherein said controller is further configured to estimate said low and high pressure exhaust gas recirculation flows including compensation for transport delays.

14. The system of claim 1 wherein said second mass airflow sensor is upstream of the turbocharger.

* * * * *